United States Patent Office  3,247,285  
Patented Apr. 19, 1966

3,247,285  
COPOLYMERS OF UNSATURATED GLYCIDYL ESTERS WITH POLYEPOXIDE SOLVENT, AND HEAT CURING THE RESULTING SOLUTION  
William J. Belanger, Louisville, Ky., assignor, by mesne assignments, to Celanese Coatings Company, a corporation of Delaware  
No Drawing. Filed Nov. 9, 1962, Ser. No. 236,726  
15 Claims. (Cl. 260—836)

This application is a continuation-in-part of my copending U.S. patent application Serial No. 859,165, filed December 14, 1959, now abandoned.

This invention relates to the polymerization of unsaturated glycidyl esters, such as glycidyl acrylate and the like, with compounds copolymerizable therewith containing a single double bond, that is, monoethylenically unsaturated monomers. The invention relates particularly to the formation of glycidyl ester copolymer solutions which can be used in the preparation of molded articles, castings and in the formation of other shaped articles.

Polymers and copolymers of unsaturated glycidyl esters are well known. They are prepared by polymerizing the glycidyl ester either alone or with other polymerizable compounds, generally in an emulsion system or in the presence of a volatile solvent such as ketones, aromatics and esters.

In emulsion polymerization, the drying of the coagulum is difficult because of the great tendency of the polymer to coalesce. Subsequent mastication with cross-linking agents is also difficult. Accordingly, emulsion polymerized glycidyl ester copolymers are generally used as film-forming materials rather than in pottings, castings and the like.

Solution polymerization of glycidyl esters has the disadvantage that resulting polymer or copolymer solutions do not lend themselves to the formation of molded articles because of the difficulty of removing the solvent. Even when a low boiling solvent such as acetone is used and the product is subjected to vacuum distillation, it is difficult to form castings free of entrained solvent or of bubbles resulting from solvent liberation. The fact that polymers of this type must be made in solvents has prohibited an extensive use of glycidyl ester polymers in the potting and castings fields.

By the practice of this invention, a process is provided for the preparation of solutions of glycidyl ester polymers for applications heretofore not practical through the use of polymer solutions. In accordance with the invention, the monomer or monomers are polymerized in the presence of a reactive solvent. By "reactive solvent" is meant a non-volatile solvent in which the polymer is soluble under polymerization conditions and which reacts with the polymer and/or a cross-linking agent for the polymer under curing conditions, that is, at curing temperatures, and if necessary, in the presence of a catalyst. It is understood, of course, that under polymerizing conditions, the solvent and the monomers are substantially nonreactive with each other. In other words, the polymerization medium is a solvent which does not react with the monomer or the polymer during polymerization, but which reacts either with the polymer when a catalyst is used or with a cross-linking agent or both.

Polymer solutions are thus formed which can be mixed with cross-linking agents to form cured compositions without the need for solvent liberation. This not only renders the polymer solutions particularly suitable for pottings, castings and encapsulations, but also provides a convenient reaction medium for making high polymers which otherwise would be of little value in the pottings, castings, encapsulations, etc., fields because of their extreme viscosities.

Reactive solvents which are employed in accordance with the practice of this invention are mono- and polyepoxides, that is, epoxy compositions having 1,2-epoxy groups. Each epoxy composition has a boiling point of 150° C. or above, each being liquid at the polymerization temperature employed; that is, they have melting points below the polymerization temperature used, generally 60° C. to 150° C. The viscosity of the solvent should not be greater than 130 centipoises at the polymerization temperature. Of epoxides serving as reactive solvents, monoepoxides are suitable, but polyepoxides are preferred. Examples of monoepoxide polymerization media are such monoepoxides as styrene oxide, glycidol, phenyl glycidyl ether, glycidyl acetate, glycidyl benzoate, butyl glycidyl ether, vinylcyclohexene monoxide, 1,4-dichloro-2,3-epoxybutane, dipentene monoxide, and the like.

Among the polyepoxide, preferred epoxides are those which in admixture with the monomers form at the reaction temperature liquid solutions having viscosities not exceeding 130 centipoises. Such epoxides are glycidyl polyethers of polyhydric alcohols and polyhydric phenols prepared by reacting the alcohol or phenol with a halohydrin such as epichlorohydrin in the presence of an alkali. These are the well-known ethoxyline resins and are described in such patents as U.S. 2,467,171, U.S. 2,-538,072, U.S. 2,582,985, U.S. 2,615,007, U.S. 2,698,315 and U.S. 2,581,464. In addition to glycidyl ethers, epoxy esters are included. Desirable epoxy esters can be made by the epoxidation of unsaturated esters by reaction with a peracid such as peracetic acid or performic acid, a desirable ester thus prepared being, 3,4-epoxy-6-methylcyclohexylmethyl - 3,4 - epoxy - 6 - methylcyclohexanecarboxylate,

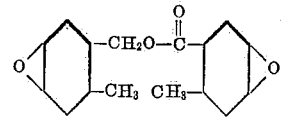

Epoxidized drying oils are also included, for example, epoxidized esters of the polyethylenically unsautrated monocarboxylic acids, such as epoxidized linseed, soybean, perilla, oiticia, tung, walnut and dehydrated caster oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflow, rapseed, hempseed, sardine, cottonseed oil, and the like.

Another class of epoxy esters includes epoxidized derivatives of polyethylenically unsaturated polycarboxylic acids such as, for example, dimethyl 8,9,12,13-diepoxyeicosanedioate, dibutyl 7,8,11,12 - diepoxyoctadecanedioate, dioctyl 10,11 - diethyl - 8,9,12,13-diepoxy-eicosanedioate, dihexyl 6,7,10,11-diepoxyhexadecanedioate, diethyl 5,6,10,11-diepoxyoctadecyl succinate, and the like. Also included are epoxidized esters of unsaturated monohydric alcohols and polycarboxylic acids such as, for example, di(2,3-epoxybutyl) adipate, di(2,3-epoxybutyl)

oxalate, di(2,3 - epoxyhexyl) succinate, di(3,4 - epoxybutyl) maleate, di(2,3-epoxyoctyl) pimelate, di(2,3-epoxybutyl) phthalate.

Another group comprises the epoxidized polyethylenically unsaturated hydrocarbons, such as epoxidized 2,2-bis(2-cyclohexenyl) propane, epoxidized vinyl cyclohexene, and epoxidized dimer of cyclopentadiene.

The invention also contemplates epoxidized polymers and copolymers of diolefins, such as butadiene. Examples of this include, among others, butadiene-acrylonitrile copolymers (Hycar rubbers), butadiene-styrene copolymers and the like.

Also included are the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Another group of the epoxy-containing materials include those epoxidized esters of unsaturated alcohols and unsaturated carboxylic acids, such as 2,3-epoxybutyl 3,4-epoxypentanoate, 3,4-epoxyhexyl, 3,4-epoxypentanoate, 3,4-epoxycyclohexyl 3,4-epoxycyclohexanoate, 3,4-epoxycyclohexyl 4,5 - epoxyoctanoate, 2,3 - epoxycyclohexylmethyl epoxycyclohexane carboxylate.

It is noted that the reactive solvent need not be a liquid at room temperature. It is necessary only that it have a viscosity of not more than 130 centipoises at the polymerization temperature. It is a low melting compound which will be liquid at the polymerization temperature. The reactive solvents set forth hereinbefore make excellent reaction media. In some cases upon cooling, crystalline solids result which can be readily liquified on heating. If desired, the solid polymer-solvent compositions can be pulverized for convenience in use.

Methods of preparing glycidyl ester copolymers are well known and need not be discussed at length herein. One method involves making the glycidyl ester first, such as glycidyl acrylate, and polymerizing this compound by itself or with another monomer. Another method is to prepare the acrylic acid copolymer first and then form the glycidyl ester of the copolymer. Polymerization is effected by conventional solution polymerization techniques using free radical or ionic catalysis, in either case, except that the polymerization medium contemplated herein is used as a solvent rather than one of the conventional volatile media. The amount of polymerization medium employed will depend upon several things; the viscosity of the medium, the molecular weight of the polymer made, and the solubility of the polymer in the medium. Thus, when the reaction medium is a low molecular weight material, less will be required when a more viscous high molecular weight composition is used. In addition, if a low molecular weight polymer is made, not as much medium is required as when a higher molecular weight polymer is prepared. This being the case, it can best be stated that sufficient polymerization medium is used to form, at the reaction temperature, a solution of the resulting glycidyl ester copolymer in the polymerization medium. From 5 to 95 parts glycidyl ester, preferably 10 to 50, are reacted with 90 to 50 parts comonomer, the polymerization reaction being carried out at temperatures of from 60° C. to 150° C., and in some cases, if desired, at a pressure slightly above atmospheric. The polymerization reaction is, of course, accelerated by the use of heat and other conditions such as free radical or ionic catalysts, e.g. benzoyl peroxide, cumene hydroperoxide, tertiary butyl hydroperoxide, phthalic peroxide, acetyl peroxide, lauroyl peroxide, di-tertiarybutyl peroxide, aluminum chloride, stannic chloride, boron trifluoride, etc. Glycidyl ester copolymers prepared according to the present invention are thus formed by reacting a polymerizable monoethylenically monounsaturated monomer with a glycidyl ester having the following formula,

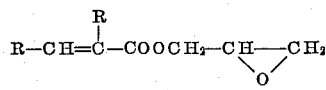

where R is a hydrogen or methyl radical, but one R is hydrogen when the other is methyl, examples of such glycidyl esters being glycidyl acrylate, glycidyl crotonate, glycidyl methacrylate and the like. Additional glycidyl esters include glycidyl maleate, glycidyl fumarate and glycidyl itaconate.

Polymerized with the alpha-beta unsaturated acid is a monoethylenically unsaturated monomer free of substituents reactive with epoxide groups. By a monoethylenically unsaturated monomer is intended an organic compound containing a single vinyl, vinylidene or vinylene group. Preferred monomers are liquids containing a vinyl group attached to a negative radical which are compatible with the glycidyl ester and soluble in the epoxide reactive solvent.

Such monomers being well known, the following is only a partial list of suitable monoethylenically unsaturated compounds:

Monoolefinic aromatic hydrocarbons, that is, monomers containing only atoms of hydrogen and carbon, such as styrene, alpha-methyl styrene, alpha-ethyl styrene, alpha-butyl styrene and vinyl toluene and the like;

Halogenated monoolefinic aromatic hydrocarbons, that is, monomers containing carbon, hydrogen and one or more halogen atoms, such as alpha-chlorostyrene, alpha-bromo-styrene, 2,5-dichloro-styrene, 2,5-dibromostyrene, 3,4-dichlorostyrene, 3,4-difluorostyrene, ortho, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, and the like;

Esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o- methoxybenzoate, vinyl p-ethoxybenzoate, methyl methacrylate, ethyl methacrylate, propyl methacrylate, butyl methacrylate, amyl methacrylate, decyl methacrylate, methyl crotonate, hexyl methacrylate, heptyl methacrylate, octyl methacrylate, ethyl crotonate and ethyl tiglate, methyl acrylate, ethyl acrylate, propyl acrylate, isopropylacrylate, butyl acrylate, isobutyl acrylate, amyl acrylate, hexyl acrylate, 2-ethyl-hexyl acrylate, heptyl acrylate, octyl acrylate, 3,5,5-trimethylhexyl acrylate, decyl acrylate and dodecyl acrylate, isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl- p-chlorobenzoate, isopropenyl o-bromobenzoate, isopropenyl m-chlorobenzoate, isopropenyl toluate, isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chlorocarbonate, allyl formate, allyl acetate, allyl propionate, allyl butyrate, allyl valerate, allyl caproate, allyl 3,5,5-trimethylhexoate, allyl benzoate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from each alkenyl alcohol such as beta-ethyl allyl alcohol, beta-propyl allyl alcohol, 1-buten-4-ol, 2-methylbuten-1 - ol-4, 2-(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-choloracrylate, octyl alpha-chloroacrylate, 3,5,5,-trimethylhexyl alpha-chloroacrylate, decyl alpha-chloroacrylate, methyl alpha-cyano acrylate, ethyl alpha-cyanoacrylate, amylcyano acrylate and decyl alpha-cyanoacrylate;

Dimethyl maleate, diethyl maleate, dimethyl fumarate, and diethyl glutaconate;

Organic nitriles such as acrylonitrile, methacrylonitrile, ethacrylonitrile, crotonitrile, and the like;

Amides such as acrylamide, alpha-methyl acrylamide, N-phenyl acrylamide, N-methyl, N-phenyl acrylamide, and the like.

In the formation of shaped articles from the copolymer solutions of this invention, the glycidyl ester copolymer in the epoxide reactive solvent is heated with a cross-linking agent such as an amine, an amino-amide, an anhydride, a polyisocyanate, or a BF$_3$ catalyst in an amount sufficient to form the cross-linked product. In other words, any of the well known curing agents or epoxide resins can be used, for instance, acids, anhydrides, amines, and BF$_3$ complexes; such as oxalic acid, phthalic anhydride, maleic anhydride, hexahydrophthalic anhydride, pyromellitic dianhydride, aliphatic amines such as diethylene triamine, ethylene diamine, triethylenetetramine, dimethylamino propylamine, modified amines such as the amino-amides, amine ethylene oxide adduct, tertiary amines such as triethylamine, trimethylamine, aromatic amine such as methylene dianiline, benzyl dimethylamine and dimethyl aminomethyl phenol, as well as quaternary ammonium salts such as benzyltrimethylammonium chloride, benzyltriethylammonium chloride, benzyltrimethylammonium bromide, benzyltrimethylammonium acetate, tolyltrimethylammonium chloride, benzyltrimethylammonium phosphate and trimethylammonium lactate and the like. The amount of cross-linking agent or epoxy converter as it may be called, depends upon whether the converter is a cross-linking agent or a catalyst accelerating cross-linking. Catalysts such as benzyl trimethyl ammonium chloride and the BF$_3$ complexes are generally employed in small amounts such as 0.1 to 10 percent. On the other hand, materials such as anhydrides and acids which react with the glycidyl ester copolymer or the reactive solvent to bring about cross-linking are used in larger quantities generally equivalent or nearly equivalent amounts. A desirable cross-linking agent of this type is a carboxy copolymer. This can be made in a reactive solvent according to copending application Serial No. 788,046, filed January 21, 1959, and the two solutions can be combined on the basis of one carboxy equivalent of the carboxy copolymer per epoxide equivalent of the glycidyl ester copolymer solution. By a carboxy equivalent copolymer is meant an amount, in grams, of copolymer containing one carboxyl group, whereas by an epoxide equivalent of copolymer solution is meant the amount of copolymer-diluent combination which contains one epoxide group.

The converters having both catalytic and chemical action such as amines, can be employed in small or large quantities, say 0.1 percent based on the ester copolymer epoxide mixture to one amino group per epoxide group in the mixture.

While the process for preparing glycidyl ester copolymers in reactive diluents is believed novel, it is also believed that the resulting compositions of matter are new, that is, a glycidyl ester copolymer composition which is devoid of conventional volatile solvent having been provided for use in the plastics field. Glycidyl ester copolymers in admixture with low molecular weight epoxides improve leveling characteristics to a considerable degree.

There is provided a glycidyl ester copolymer in homogenous admixture with a strongly polar medium having a viscosity of less than 130 centipoises at 150° C. which is reactive with the glycidyl ester polymer and, if not, with a cross-linking agent, the medium being a mono- or di-epoxide. These compositions can be made not only by the process of this invention, but by conventional means. When conventional polymerization methods are employed, the solvent must be distilled off or otherwise replaced with the reactive medium. This aspect of the invention is illustrated by Example 1.

EXAMPLE 1

| Material: | Weight (grams) |
|---|---|
| Methyl acrylate | 192.0 |
| Glycidyl methacrylate | 48.0 |
| Benzoyl peroxide | 6.00 |
| Xylene | 160.0 |
| Epoxide 190 | 240.0 |

In a one liter three-necked, round-bottomed flask equipped with an agitator, thermometer, condenser, and dropping funnel, the 160.0 grams of xylene are heated to 125° C. In an Erlenmeyer flask the methyl acrylate, glycidyl methacrylate and 4.8 grams of the benzoyl peroxide are stirred until complete solution results. The monomer catalyst solution is then introduced into the flask containing the heated solvent by means of the dropping funnel during the ensuing one and one-half hours, while the temperature of the flask contents is maintained at 125° C. After all of the monomer-catalyst solution is added, the flask contents are refluxed at 125° C. for an additional thirty minutes. The charge is cooled to 80° C., 1.2 grams of benzoyl peroxide are added, and the flask contents are then refluxed at 131° C. to 136° C. one more hour. A 60 percent solids solution of an 80/20 methyl acrylate/glycidyl methacrylate copolymer in xylene results having an epoxide equivalent of 678. At this point, 240.0 grams of Epoxide 190 are added to the copolymer solution, the flask is fitted for vacuum distillation and the xylene is vacuum distilled off. The resulting product is mixed with butyl glycidyl ether in the ratio of 15 grams of product to 2 grams of butyl glycidyl ether to produce a composition having a weight per epoxide of 291 and a melting point of 43° C.

It is understood that while all of the solvent can be distilled off when a volatile solvent is used as in Example 1, the preferred method of preparing the composition is to prepare it in a reactive solvent in accordance with this invention as described hereinbefore. This aspect of the invention is illustrated by the following examples. The examples are for the purpose of illustration only, and it is intended that no undue limitation be read into the invention by referring to the examples or the discussion thereof. Epoxide 190 employed in Examples 1 and 4 is a diepoxide with an epoxide equivalent of 190, prepared by reacting epichlorohydrin with bisphenol using a ratio of 10 mols of epichlorohydrin to 1 mol of bisphenol.

EXAMPLE 2

| Material: | Weight (grams) |
|---|---|
| Styrene | 100.0 |
| Glycidyl methacrylate | 100.0 |
| Benzoyl peroxide | 5.0 |
| Diglycidyl ether of 1,5-pentanediol | 200.0 |

In a one liter, three-necked, round-bottomed flask fitted with an agitator, thermometer, condenser, and dropping funnel, the 200 grams of the diglycidyl ether of 1,5-pentanediol are heated to 125° C. The monomer-catalyst solution, prepared by mixing together the styrene, glycidyl methacrylate, and 4 grams of the benzoyl peroxide, is then added to the heated epoxide through the dropping funnel during the ensuing hour, while the temperature of the flask contents is held at 125° C. to 132° C. After all of the monomer-catalyst solution is added, the flask contents are heated at 150° C. to 160° C. for an additional hour. The charge is cooled to 80° C., one gram of benzoyl peroxide is added, and the reaction mixture is heated at 150° C. to 160° C. one more hour. The flask is fitted for vacuum distillation and any unreacted substances are distilled off at a temperature of 120° C. under aspirator vacuum. The resulting composition is 50/50 styrene/glycidyl methacrylate copolymer dissolved in the diglycidyl ether of 1,5-pentanediol. The composition has a viscosity of $Z_6$ (Gardner-Holdt) and a weight per epoxide of 210.74.

EXAMPLE 3

| Material | Units | Weight (grams) |
|---|---|---|
| Vinyl Toluene | 50.0 | 100.0 |
| Glycidyl Methacrylate | 50.0 | 100.0 |
| Benzoyl Peroxide | 2.0 | 4.0 |
| Butyl Glycidyl Ether | | 100.0 |
| 3,4-epoxy-6-methylcyclohexylmethyl-3,4-epoxy-6-methylcyclohexane carboxylate (Epoxide A) | | 100.0 |

Part A

In a one liter, three-necked, round-bottomed flask fitted with an agitator, thermometer, and dropping funnel, the 100 grams of butyl glycidyl ether and the 100 grams of Epoxide A are heated together to 120° C. In an Erlenmeyer flask, the vinyl toluene, glycidyl methacrylate, and benzoyl peroxide are stirred until complete solution results. This monomer-catalyst solution is then introduced into the flask containing the heated diluent by means of a dropping funnel during the ensuing hour at a temperature of 120° C. After all of the monomer-catalyst solution is added, the flask contents are heated at a temperature of 114° C. to 128° C. for an additional four hours. The resulting composition is a 50 percent solution of a 50/50 vinyl toluene/glycidylmethacrylate copolymer in a 50/50 mixture of butyl glycidyl ether and Epoxide A, having a viscosity of $Z_5$ (Gardner-Holdt). The copolymer component of the solution has a theoretical epoxide equivalent of 284, while the total solution has a theoretical epoxide equivalent of 187.

Part B

In a suitable container 10.0 grams of the copolymr solution of Part A and 6.0 grams of methyl endo-cis-bicyclo[2,2,1]-5-heptene-2,3-dicarboxylic anhydride are heated with stirring until the mixture has melted. As a catalyst, .16 gram of dimethyl aminomethyl phenol is added to the mixture. The mixture when heat cured for one hour at 100° C., followed by a three hour post-cure at 180° C., yields a very tough casting with excellent hardness and flexibility properties.

The copolymer solution of Part A is also cured using commercially available polymerized soya fatty acids in amounts of 10.0 grams of the copolymer solution to 4.3 to 10.0 grams trimer acids in the presence of .16 gram dimethyl aminomethyl phenol. The fatty acids are liquid tricarboxylic polymers having approximate molecular weights of 900 and acid values of 183 to 188.

Soft, rubbery castings result with firmness or rigidity increasing as the amount of polymeric acids increases.

EXAMPLE 4

| Material: | Weight (grams) |
|---|---|
| Vinyl toluene | 100.0 |
| Glycidyl methacrylate | 100.0 |
| Benzoyl peroxide | 4.0 |
| Butyl glycidyl ether | 100.0 |
| Epoxide 190 | 100.0 |

Part A

In accordance with Example 3, the butyl glycidyl ether and Epoxide 190 are heated together in a one liter flask to 125° C. At this temperature, the monomer-catalyst solution, prepared by combining the vinyl toluene, glycidyl methacrylate, and benzoyl peroxide is added to the heated solvent mixture over a period of one hour at a temperature of 125° C. to 130° C. After all of the monomer-catalyst solution is added, the flask contents are heated at 120° C. to 125° C. for an additional four hours. The resulting composition is a 50 percent solution of a 50/50 vinyl toluene/glycidyl methacrylate copolymer in a 50/50 mixture of butyl glycidyl ether and Epoxide 190. The copolymer component of the solution has a theoretical epoxide equivalent of 284, while the total solution has a theoretical epoxide equivalent of 200.

Part B

In accordance with Part B of Example 3, 10.0 grams of the copolymer solution of Part A and 6.0 grams of methyl endo-cis-bicyclo[2,2,1]-5-heptene-2,3-dicarboxylic anhydride are heated with stirring until the mixture has melted. As a catalyst, .16 gram of dimethyl aminomethyl phenol is added to the mixture. The mixture when heat cured for one hour at 100° C. followed by a three hour post-cure at 180° C., yields a flexible casting having excellent hardness and toughness properties.

The copolymer solution of Part A is also cured by using a mixture of methyl endo-cis-bicyclo[2,2,1]-5-heptene-2,3-dicarboxylic anhydride and polypropylene glycol having a molecular weight of 750 in amounts of 10.0 grams copolymer solution, 7.0 grams anhydride, 1.0 to 2.0 grams polypropylene glycol 750, and .16 gram dimethyl aminomethyl phenol. The cured castings produced had good flexibility and excellent hardness and toughness properties.

It has been pointed out that there are many ways of curing the compositions prepared in accordance with this invention, a wide variety of catalyst or converters being available. These and other ramifications and variations will occur to those skilled in the art. Such obvious modifications are deemed to be within the scope of this invention.

What is claimed is:

1. A process for the preparation of a glycidyl ester copolymer solution devoid of solvent boiling below 150° C. and capable of being readily cured which comprises polymerizing, at a temperature of from 60° C. to about 150° C., a solution comprising
   (A) 5–95 weight percent of an unsaturated glycidyl ester monomer selected from at least one member of the group consisting of glycidyl acrylate, glycidyl methacrylate, glycidyl crotonate, glycidyl maleate, glycidyl fumarate, and glycidyl itaconate,
   (B) 95–5 weight percent of a different monoethylenically unsaturated monomer, free of substituents reactive with 1,2-epoxy groups, copolymerizable with said (A), and
   (C) as the sole polymerization solvent, an epoxide compound,
said (C)
   (1) being a solvent for and non-reactive with said (A), said (B) and said glycidyl ester copolymer under the polymerization conditions used,
   (2) being present in an amount sufficient to dissolve said (A), said (B) and said glycidyl ester copolymer,
   (3) having at least one 1,2-epoxy group,
   (4) being free of ethylenic unsaturation capable of polymerization with the unsaturated groups in said (A) and said (B) under the polymerization conditions used,
   (5) having a melting point below the polymerization temperature,
   (6) having a boiling point of at least 150° C.,
   (7) having a viscosity not exceeding 130 centipoises at the polymerization temperature, and
   (8) being capable of entering the curing reaction when said glycidyl ester copolymer is cured.

2. A process as described in claim 1 wherein polymerization is effected using a vinyl polymerization catalyst.

3. A process as described in claim 1 wherein said (A) is glycidyl methacrylate.

4. A process as described in claim 1 wherein said (A) is glycidyl methacrylate and said (B) is styrene.

5. A process as described in claim 1 wserein said (A) is glycidyl methacrylate and said (B) is vinyl toluene.

6. A process as described in claim 1 wherein said (A) is glycidyl methacrylate and said (B) is methyl acrylate.

7. A process as described in claim 1 wherein said (C) is a diglycidyl ether of a dihydric phenol.

8. A process as described in claim 1 wherein said (C) is the diglycidyl ether of bisphenol A.

9. A process as described in claim 1 wherein said (C) is the diglycidyl ether of 1,5-pentanediol.

10. A process as described in claim 1 wherein said (C) is 3,4 - epoxy - 6 - methylcyclohexylmethyl-3,4-epoxy-6-methylacyclohexanecarboxylate.

11. A process as described in claim 1 wherein said (C) is a mixture of a diglycidyl ether of a dihydric phenol and a monoglycidyl ether of a monohydric alcohol.

12. A process as described in claim 1 wherein said (C) is butyl glycidyl ether.

13. A process for the preparation of a cured glycidyl ester copolymer which comprises adding to an uncured glycidyl ester copolymer solution prepared as described in claim 1 about one anhydride equivalent of a carboxylic acid anhydride per epoxy equivalent of said solution, and heat-curing the resulting composition.

14. A process for the preparation of a cured glycidyl ester copolymer which comprises adding to an uncured glycidyl ester copolymer solution prepared as described in claim 1 about one amine hydrogen equivalent of a polyamine per epoxy equivalent of said solution, and heat-curing the resulting composition.

15. A process for the preparation of a cured glycidyl ester copolymer which comprises adding to an uncured glycidyl ester copolymer solution prepared as described in claim 1 from about 0.1 to about 10 weight percent, based on the weight of said solution, of an epoxy resin curing agent selected from the group consisting of tertiary amines, quaternary ammonium salts and $BF_3$ complexes, and heat-curing the resulting composition.

References Cited by the Examiner

UNITED STATES PATENTS 2,580,901   1/1952   Erickson _____ 260—2

OTHER REFERENCES

Lee and Neville: Epoxy Resins, McGraw-Hill, N.Y., 1957, pp. 141–142 relied on.

MURRAY TILLMAN, *Primary Examiner.*

E. J. TROJNAR, *Assistant Examiner.*